(12) United States Patent
Kelly

(10) Patent No.: US 11,587,196 B2
(45) Date of Patent: Feb. 21, 2023

(54) INFORMATION HANDLING SYSTEM REMOTE DESKTOP PROTOCOL SELECTION

(71) Applicant: Dell Products L.P., Round Rock, TX (US)

(72) Inventor: John Kelly, Mallow (IE)

(73) Assignee: Dell Products L.P., Round Rock, TX (US)

( * ) Notice: Subject to any disclaimer, the term of this patent is extended or adjusted under 35 U.S.C. 154(b) by 488 days.

(21) Appl. No.: 15/482,974

(22) Filed: Apr. 10, 2017

(65) Prior Publication Data

US 2018/0295216 A1 Oct. 11, 2018

(51) Int. Cl.
| | | |
|---|---|---|
| G06F 15/173 | (2006.01) | |
| G06T 1/20 | (2006.01) | |
| H04L 12/46 | (2006.01) | |
| H04L 69/165 | (2022.01) | |
| H04L 69/18 | (2022.01) | |
| G06F 9/451 | (2018.01) | |
| G06F 9/455 | (2018.01) | |
| H04L 67/63 | (2022.01) | |

(52) U.S. Cl.
CPC ............... G06T 1/20 (2013.01); G06F 9/452 (2018.02); G06F 9/45558 (2013.01); H04L 12/4641 (2013.01); H04L 67/63 (2022.05); H04L 69/165 (2013.01); H04L 69/18 (2013.01); *G06F 2009/45579* (2013.01)

(58) Field of Classification Search
CPC ....... G06T 1/20; G06F 9/542; G06F 9/45558; G06F 2009/45579; H04L 12/4641; H04L 67/327; H04L 69/165; H04L 69/18

USPC .......................................................... 709/223
See application file for complete search history.

(56) References Cited

U.S. PATENT DOCUMENTS

| | | | |
|---|---|---|---|
| 8,200,796 B1* | 6/2012 | Margulis ............ | H04N 21/4437 709/223 |
| 8,640,126 B2* | 1/2014 | Halperin ............. | G06F 9/45537 718/1 |
| 8,756,293 B2* | 6/2014 | Duggal .................. | H04L 67/10 709/217 |
| 9,002,982 B2* | 4/2015 | Suryanarayanan ... | H04L 67/327 709/217 |
| 9,063,691 B2* | 6/2015 | Husain ..................... | G06F 3/14 |
| 9,201,667 B2* | 12/2015 | Ringdahl .................. | G06F 8/63 |
| 9,542,080 B2* | 1/2017 | Beveridge ............ | G06F 3/0484 |
| 9,686,323 B1* | 6/2017 | Helter ................. | H04L 65/1066 |
| 2010/0293504 A1* | 11/2010 | Hachiya .................. | G06F 9/451 715/806 |
| 2011/0025696 A1* | 2/2011 | Wyatt ..................... | G09G 5/363 345/502 |
| 2013/0093776 A1* | 4/2013 | Chakraborty ........... | G06F 9/452 345/520 |

(Continued)

*Primary Examiner* — Hua Fan
(74) *Attorney, Agent, or Firm* — Zagorin Cave LLP; Robert W. Holland

(57) ABSTRACT

A connection analyzer at a server information handling system analyzes virtual desktop requests from client information handling systems to prioritize available virtual desktop display protocols for responding to the requests based upon the client type and network interface. The virtual desktop is established by reference to a priority list of virtual desktop display protocols available for sending virtual desktops from a server information handling system.

17 Claims, 3 Drawing Sheets

(56) References Cited

U.S. PATENT DOCUMENTS

| | | | | |
|---|---|---|---|---|
| 2013/0318522 | A1* | 11/2013 | Devireddy | H04L 12/6418 718/1 |
| 2014/0195838 | A1* | 7/2014 | Yechieli | G06F 1/3209 713/323 |
| 2014/0258450 | A1* | 9/2014 | Suryanarayanan | H04L 67/1097 709/217 |
| 2015/0043345 | A1* | 2/2015 | Testicioglu | H04L 47/24 370/232 |
| 2015/0113528 | A1* | 4/2015 | Kim | G06F 9/452 718/1 |
| 2016/0224359 | A1* | 8/2016 | Ayanam | G06F 3/06 |
| 2016/0286003 | A1* | 9/2016 | Pessis | H04L 67/42 |
| 2016/0363979 | A1* | 12/2016 | Oh | G06F 9/45533 |
| 2017/0054987 | A1* | 2/2017 | Rangarajan | H04L 67/02 |
| 2017/0185437 | A1* | 6/2017 | Thomas | G06F 9/45558 |
| 2017/0235357 | A1* | 8/2017 | Leung | G06F 1/3265 713/310 |
| 2018/0083837 | A1* | 3/2018 | Teng | H04L 41/046 |
| 2018/0234502 | A1* | 8/2018 | Petrick | H04L 67/14 |
| 2018/0349283 | A1* | 12/2018 | Bhatia | H04N 21/4782 |

\* cited by examiner

INFORMATION HANDLING SYSTEM REMOTE DESKTOP PROTOCOL SELECTION

BACKGROUND OF THE INVENTION

Field of the Invention

The present invention relates in general to the field of information handling system network communication, and more particularly to an information handling system remote desktop protocol selection.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often manage information through remote network-based communications. For example, enterprises often buy or lease data centers having server information handling system and storage resources that support remote client interfaces through the Internet. Client interactions with the data centers include customer clients that do business with the enterprise and employee interactions to perform enterprise functions. Hosting clients through a network interface offers enterprises increased flexibility to scale processing and storage resources and information processing needs change. In addition, enterprise employees are provided with ready access to processing resources and enterprise information from different remote or enterprise locations in a convenient manner. Enterprises gain efficiency in managing information by leasing server and storage resources from data centers so that resources adjust to enterprise needs without the enterprise purchasing or maintaining the physical resources. Rather, data centers allocate resources as processing demands change to effectively allow multiple enterprises to share the resources. For example, processing is supported by virtual machines that migrate to processing resources as needed so that the physical resources are essentially irrelevant to the enterprise.

In order to interact with remote processing resources, end users establish an Internet interface and interact through a virtual desktop presentation. As an example, an enterprise employee working remotely establishes an interface with a virtual machine running in a data center and interacts with the virtual machine through a virtual desktop presentation communicated to the end user's client so that the desktop presented at the local client represents the desktop of the virtual machine executing remotely in the data center. A number of different vendors have created display protocols that present a virtual desktop, such as RDP, PCoIP, RemoteFX. Blast Extreme, etc. These different types of virtual desktop display protocols tend to have characteristics optimized for particular types of remote processing situations. For example, some virtual desktop display protocols manage low-bandwidth and high latency communication environments better while others manage portable device communications better by reducing client power consumption to increase mobile device battery life. Data centers tend to support virtual desktop display protocols by multiple vendors so that different enterprise preferences are accommodated. Generally, information technology administrators for the enterprise or data center make ad-hoc protocol selections based upon assumptions about end user environments and activities. Such ad-hoc selections sometimes result in reduced and/or irregular performance depending upon the end user's actual environment.

SUMMARY OF THE INVENTION

Therefore, a need has arisen for a system and method which automate remote desktop protocol selection to support virtual desktop communications.

In accordance with the present invention, a system and method are provided which substantially reduce the disadvantages and problems associated with previous methods and systems for presenting virtual desktops at remote clients. Virtual desktop requests by client information handling systems are analyzed to determine a priority list of virtual desktop display protocols available to establish the virtual desktop interface. The virtual desktop is established by reference to the priority list and available virtual desktop display protocols.

More specifically, client information handling systems request virtual desktop presentations through a network, such as by sending virtual desktop requests to server information handling systems that support virtual machines. A connection analyzer associated with the server information handling systems receives the virtual desktop requests and analyzes the requests to determine the requesting device type and network parameters. Based upon the analysis, the connection analyzer generates a list of prioritized virtual desktop display protocols and establishes the virtual desktop interface with the requesting device based upon available virtual desktop display protocols. For example, requests from mobile information handling systems have virtual desktop display protocols prioritized that generate the virtual desktop at the client with a graphics processing unit so that less power is used by the client device to present the virtual desktop. If the mobile client indicates that it is operating on external power instead of battery power, power consumption is de-prioritized as a consideration for selecting a virtual desktop display protocol. Thus, selection of a virtual desktop display protocol that operates on a central processing unit or a graphics controller will be made with power consumption as less of a selection consideration, such as by giving performance or other factors a higher priority. Desktop clients that use external power de-prioritize virtual desktop display protocols that rely on graphics processing so that greater performance available from central processing unit operations have priority and offer enhanced performance where desired. As another example, if a virtual desktop request is received through a virtual private network (VPN) interface, the type of virtual desktop display protocol selected may depend upon the type of VPN interface, such as by matching the layer four protocol of the virtual desktop display protocol with the layer four of the VPN protocol (i.e., TCP or UDP). The connection analyzer manages assignment of virtual desktop requests to server information handling systems based upon the prioritized list and the virtual desktop display protocols available at the server information handling systems.

The present invention provides a number of important technical advantages. One example of an important technical advantage is that an automated virtual desktop display protocol selection enhances end user experiences during remote virtual desktop interactions by selecting a virtual desktop display protocol adapted to the end user client's operating environment. Dynamic virtual desktop display protocol selection based upon the usage scenario, such as the type of endpoint client device, and the usage environment, such as the network related parameters, ensures an optimal end user experience is provided relative to available virtual desktop display protocols for supporting a network communication. For example, if a mobile device is detected that operates on battery, such as a smartphone or tablet, a virtual desktop display protocol is selected that relies upon GPU resources for presenting the virtual desktop, resulting in battery life being prioritized over performance on some occasions. As another example, matching the layer four protocol of the VPN and virtual desktop display protocol enhances virtual display presentation by avoiding unnecessary CPU operations, such as where UDP display protocol is used in a TCP VPN environment, or avoiding unnecessary latency, such as where a TCP display protocol is used in a UDP environment. By dynamically selecting the virtual desktop display protocol, network and processing resource allocation at both the client and host provide an optimized end user experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Client requests for virtual desktops are analyzed to prioritize virtual desktop display protocols to support the presentation of the virtual desktop at the clients. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
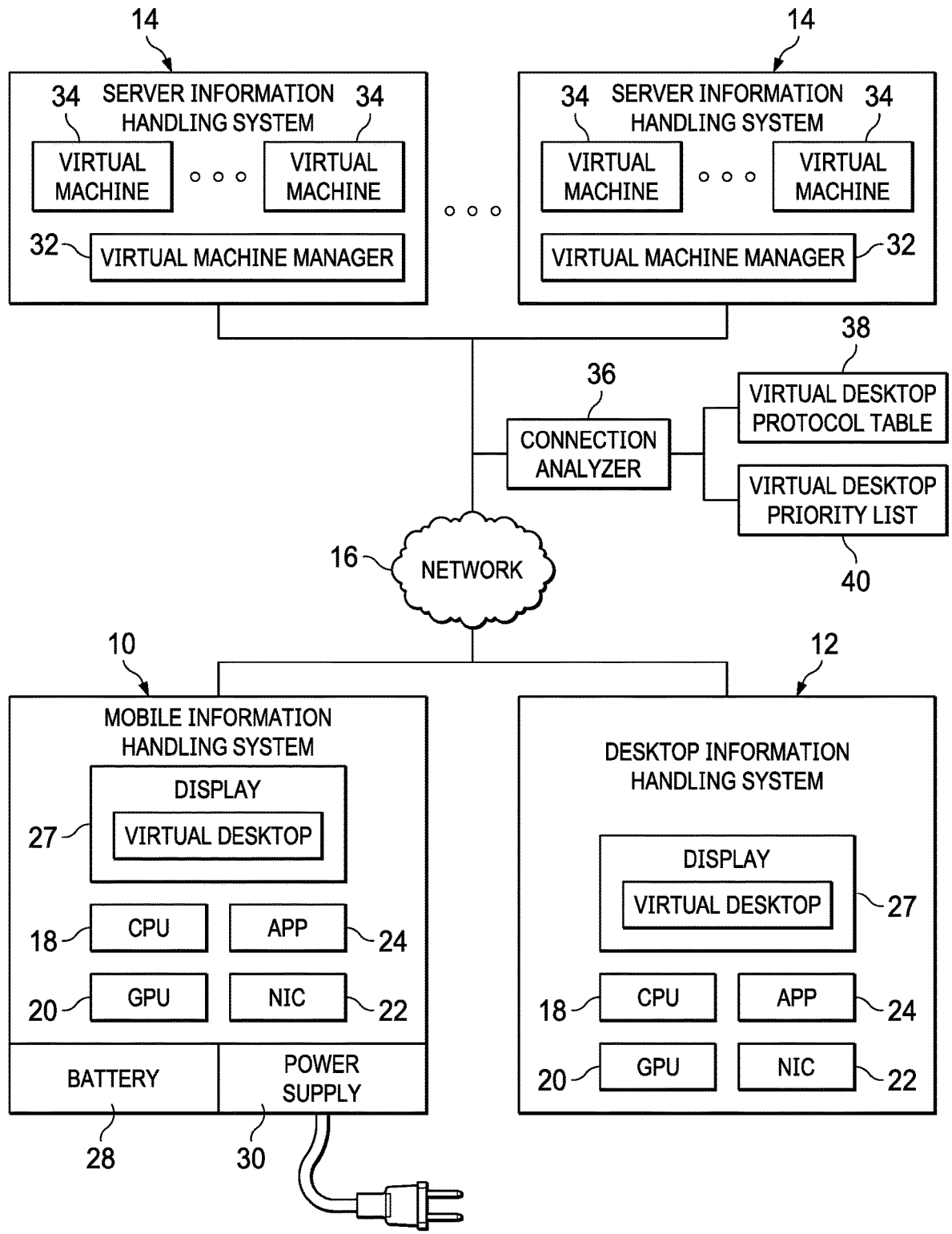
FIG. 1 depicts a block diagram of a system for automated selection of a virtual desktop display protocol for presentation of a virtual desktop at a client information handling system based upon an analysis of client and network interface parameters.

Referring now to FIG. 1, a block diagram depicts a system for automated selection of a virtual desktop display protocol for presentation of a virtual desktop at a client information handling system based upon an analysis of client and network interface parameters. In the example embodiment, a mobile information handling system 10, such as a smartphone, tablet or laptop, and a desktop information handling system 12 interface with server information handling systems 14 through a network 16, such as the Internet. Mobile and desktop information handling system 10 and 12 process information with a central processing unit (CPU) 18 that executes instructions and generates visual information for presentation. A graphics processing unit (GPU) 20 interfaced with CPU 18 accepts the visual information and generates pixel values that define images for presentation at display 26. A network interface card (NIC) 22 establishes network communications, such as through network 16. An application 24 has instructions for executing on CPU 18, such as an operating system, a browser or other types of applications. In the example embodiment, mobile information handling system 10 includes a battery 28 that powers the system when external power is not available and a power supply 30 that accepts external power to both power the system and to charge battery 28.

In the example embodiment, application 24 obtains visual information from network 16 to present a virtual desktop 27 at display 26. For instance, application 24 interfaces with a server information handling system 14 through network 16 to request a virtual desktop, such as the presentation of output from a virtual machine 34 executing over a virtual machine manager 32 on server information handling system 14. Virtual desktop 27 presented at mobile information handling system 10 and desktop information handling system 12 represents processing taking place on server information handling system 14 by a virtual machine 14 that is presented with a virtual desktop display protocol. Virtual desktop 27 may be supported with a variety of vendor protocols. For example, Microsoft has a base virtual desktop display protocol RDP with enhanced services provided by RemoteFX. Another example is the Citrix based protocol HDX as enhanced by HDX 3D Pro. These examples of virtual desktop display protocols offer tiers of service through different protocols. Another example of a virtual desktop display protocol vendor is the VMware Horizon View suite with RDP, PCoIP and Blast Extreme protocols available that each offer different advantages in different environments. For instance, Blast Extreme presents virtual desktops at a client by leveraging the client graphics processor, thus reducing power consumption at the mobile device. Other types of virtual desktop display protocols rely upon central processing unit execution, and some types of virtual desktop display protocols use TCP for more reliable communication or UDP for lower bandwidth scenarios.

A connection analyzer 36 receives virtual desktop requests from client systems, analyzes the client type and connection parameters, and applies the analysis to establish a virtual desktop connection best suited for the client based upon available virtual desktop display protocols. For example, if a client information handling system indicates that it is a mobile system, such as a laptop, tablet or smartphone, connection analyzer prioritizes a virtual desktop display protocol that uses a graphics processing unit over one that uses a central processing unit virtual desktop display protocols. If the client information handling system indicates that it is a desktop information handling system, connection analyzer 36 de-prioritizes power consumption as a virtual desktop display protocol selection criteria. As an example of network connection parameters, if the client device interfaces with a TCP based VPN, a TCP virtual desktop display protocol is prioritized over UDP virtual desktop display protocols. In contrast, if the client device interfaces with a UDP VPN, a UDP virtual desktop display protocol receives a higher priority than a TCP virtual desktop display protocol. Connection analyzer 36 generates a virtual desktop priority list 40 that lists in order of priority the virtual desktop display protocols for the client connection based upon the device and connection analysis. Connection analyzer 36 then forwards the client to a server information handling system 14 that executes the virtual machine 34 associated with the desired virtual desktop requested by the client. In one example embodiment, connection analyzer 36 references a virtual desktop display protocol table 38 to locate resources that can run the highest available priority on the virtual desktop priority list 40. In another example embodiment, connection analyzer 36 executes over a VMM 32 and migrates the virtual desktop virtual machine 34 to a server information handling system 14 that has available a prioritized virtual desktop display protocol. In one alternative embodiment, connection analyzer 36 monitors existing virtual desktop connections to adjust a connection as client type of network parameters change. For example, if a client running on battery power has a graphics processor virtual desktop display protocol and then indicates that external power has been connected to the client, connection analyzer 36 may, in one embodiment, re-establish the connection to the virtual desktop using a protocol that uses a greater proportion of central processing unit resources.

Figure 2:
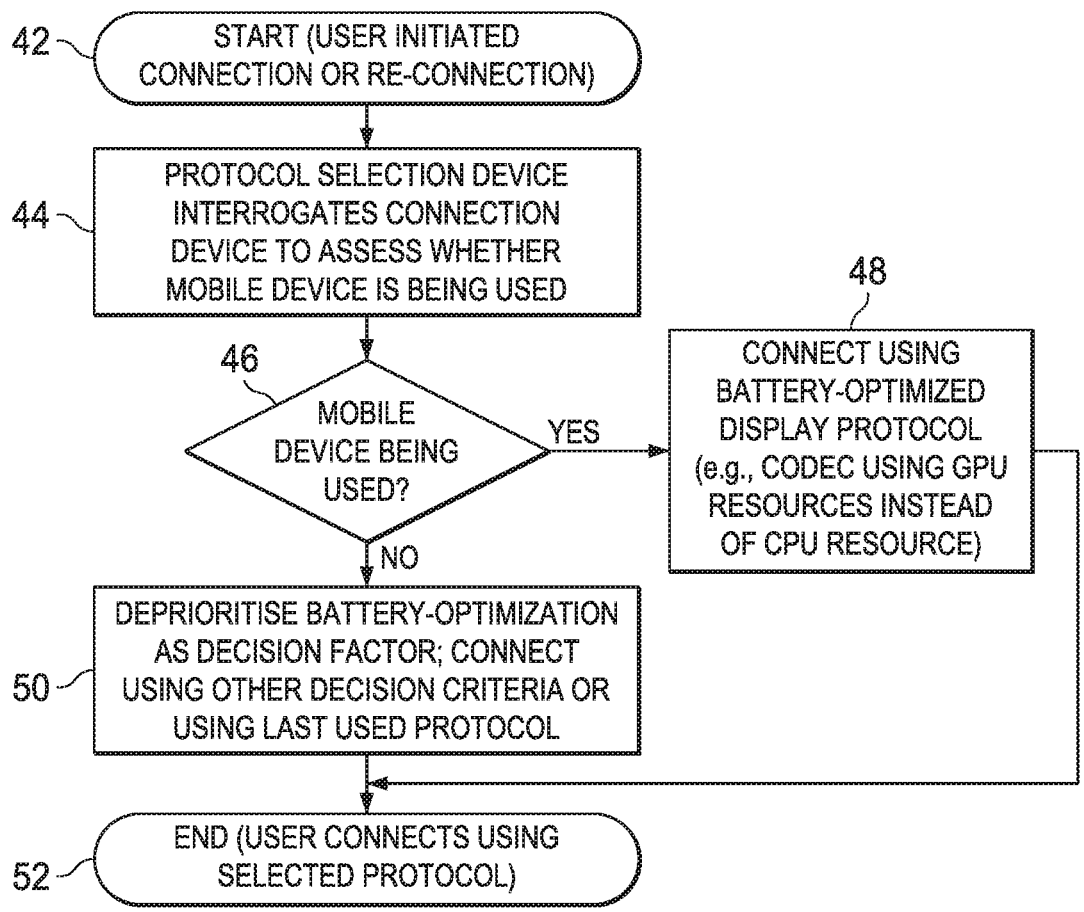
FIG. 2 depicts a flow diagram of a process for prioritizing virtual desktop display protocol selection based upon client information handling system type.

Referring now to FIG. 2, a flow diagram depicts a process for prioritizing virtual desktop display protocol selection based upon client information handling system type. The process starts at step 42 with a user initiated connection or re-connection to request a virtual desktop presentation at a client information handling system. At step 44, the connection analyzer requests the device type from the client information handling system to determine if the client is a mobile device. In one embodiment, the connection analyzer requests the power status of a mobile device response so that a mobile device that has external power connected can instead be treated as a desktop device. At step 46 a determination is made of whether the client is a mobile device. If the client is a mobile device, the process continues to step 48 to connect to a virtual desktop with a protocol having a battery-optimized display presentation, such as graphics processing unit virtual desktop display protocol. If a mobile device is not detected at step 46, the process continues to step 50 to de-prioritize battery optimization in the list of virtual desktop display protocols. At step 52 the client connects for a virtual desktop presentation with the virtual desktop display protocol in the priority list that has the highest priority and is available for use to support the virtual desktop.

Figure 3:
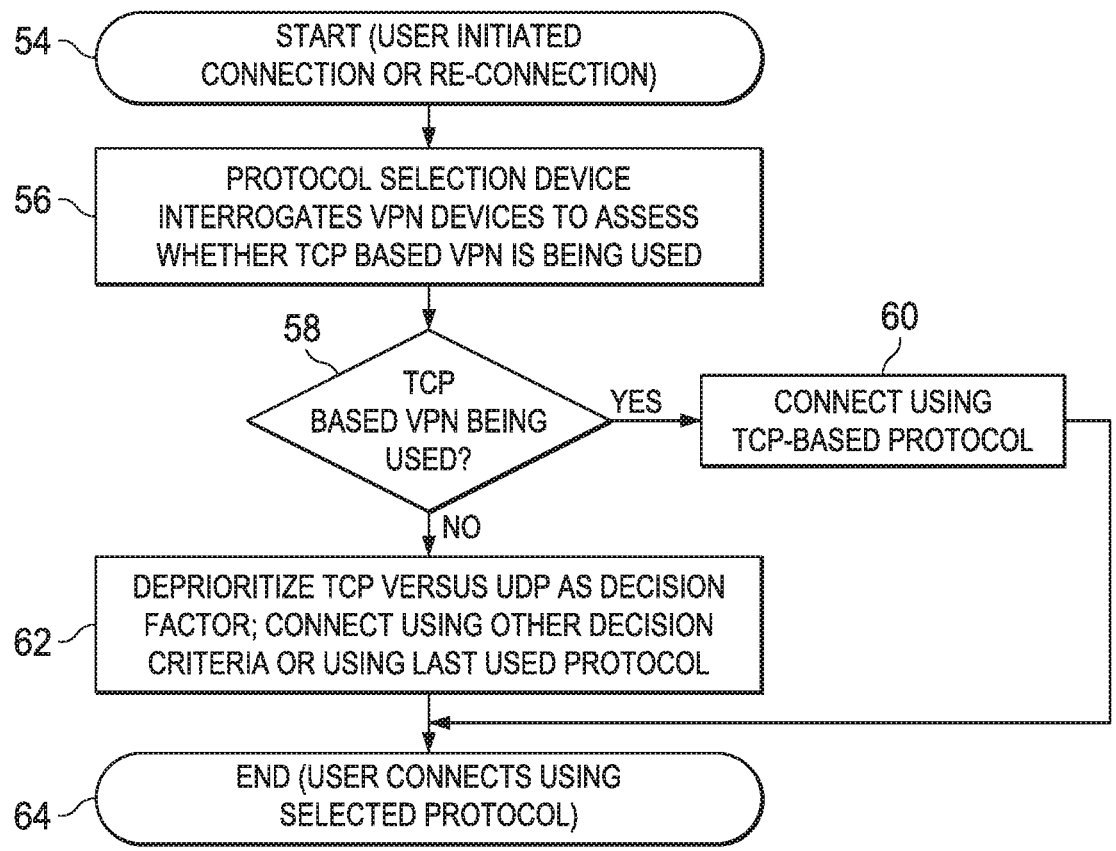
FIG. 3 depicts a flow diagram of a process for prioritizing virtual desktop display protocol selection based upon VPN type.

Referring now to FIG. 3, a flow diagram depicts a process for prioritizing virtual desktop display protocol selection based upon VPN type. The process starts at step 54 with a user initiated connection or re-connection. At step 56 the connection analyzer interrogates the VPN of the client device to assess whether a TCP based VPN is being used. If at step 58 a TCP type VPN supports the client interface, the process continues to step 60 to select a TCP-based virtual desktop display protocol for presentation of the virtual desktop. If at step 58 a TCP connection is not detected and instead a UDP connection exists, the process continues to step 62 to de-prioritize TCP versus UDP for the selection of the virtual desktop display protocol. Even if a TCP virtual desktop display protocol is available, the overhead associated with the TCP connection will not add to the user experience over top of the underlying UDP interface. At step 64, the virtual desktop display protocol available to support the client request and having the highest priority is selected to present the virtual desktop at the requesting client information handling system.

Although the present invention has been described in detail, it should be understood that various changes, substitutions and alterations can be made hereto without departing from the spirit and scope of the invention as defined by the appended claims.

What is claimed is:

1. A system for managing virtual desktop display protocol selection, the system comprising:
   one or more server information handling systems interfaced with a network and operative to support virtual desktop presentation at client information handling systems with one or more virtual desktop display protocols;
   a connection analyzer executing on the one or more server information handling systems and interfaced with the network, the connection analyzer operative to receive virtual desktop requests from client information handling systems, the connection analyzer analyzing the virtual desktop requests to prioritize a list of virtual desktop display protocols to respond to the requests based at least in part on conditions at the client information handling systems detected through the virtual desktop requests, the connection analyzer generating a priority list for each virtual desktop request when received at the connection analyzer and before initiating a virtual desktop; and
   a virtual desktop initiator executing on the one or more server information handling systems and interfaced with the connection analyzer, the virtual desktop initiator operative to initiate virtual desktops at the client information handling systems in response to each virtual desktop request from the client information handling systems with a virtual desktop display protocol selected from the priority list in an order of priority of the priority list;
   wherein:
   the virtual desktop requests include an indication of a TCP VPN with the client information handling system; and
   the connection analyzer prioritizes virtual desktop display protocols to select TCP-based protocols as a greater priority than UDP-based protocols.

2. The system of claim 1 wherein:
the virtual desktop requests include an indication of the client information handling system as a mobile information handling system; and
the connection analyzer prioritizes virtual desktop display protocols to select a protocol that uses graphics processing unit resources to reduce power consumption.

3. The system of claim 2 wherein:
the virtual desktop requests include an indication of the client information handling system as a mobile information handling system operating on external power; and
the connection analyzer reduces the priority of graphics processing unit protocols in response to the use of external power.

4. The system of claim 1 wherein:
the virtual desktop requests include an indication of a UDP network interface with the client information handling system; and
the connection analyzer prioritizes virtual desktop display protocols to select UDP-based protocols as a greater priority than TCP-based protocols.

5. The system of claim 1 wherein the connection analyzer monitors virtual desktop interfaces established with client information handling systems to detect changes to the network interface and, in response to detected changes to re-establish the virtual desktop with a different virtual desktop display protocol having a higher priority for the changed network interface.

6. The system of claim 5 wherein the change to the network interface comprises transition of the client information handling system from operating on external power to operating on battery power, and the re-established virtual desktop changes the virtual desktop display protocol from a central processing unit based to a graphics processor based virtual desktop display protocol.

7. The system of claim 1 wherein the virtual desktop initiator is further operative to compare the priority list of virtual desktop display protocols associated with the virtual desktop requests and to assign client information handling systems to a selected one of the at least one server information handling systems to establish virtual desktops based at least in part upon the prioritized list and the at least one server information handling system virtual desktop display protocol availabilities.

8. The system of claim 7 wherein the virtual desktop initiator directs client information handling systems to server information handling systems by migrating virtual machines to the server information handling system selected for the client information handling system.

9. A method for selecting a virtual desktop display protocol to present a virtual desktop at a client information handling system from a server information handling system, the method comprising:
communicating from the client information handling system through a network to the server information handling system a request to initiate a virtual desktop presentation;
receiving at the server information handling system the request for the virtual desktop presentation;
comparing the request for the virtual desktop presentation with plural virtual desktop display protocols to prioritize a list of the virtual desktop display protocols for responding to the request for the virtual desktop presentation, the prioritized list based upon conditions at the client information handling system as determined from the request for the virtual desktop presentation at the time that the request to initiate the virtual desktop presentation was received at the server information handling system and before selecting a virtual desktop display protocol to present the virtual desktop at the client information handling system;
selecting a virtual desktop display protocol based on the prioritized list;
presenting the virtual desktop at the client information handling system with the selected virtual desktop display protocol;
including with the request an indication that the client information handling system has a UDP network interface; and
prioritizing UDP virtual desktop display protocols over TCP virtual desktop display protocols.

10. The method of claim 9 further comprising:
including with the request an indication that the client information handling system comprises a mobile system; and
prioritizing graphics processing unit virtual desktop display protocols for mobile systems.

11. The method of claim 10 further comprising:
including with the request that the client information handling system has external power available; and
prioritizing central processing unit virtual desktop display protocols for mobile systems that have external power available.

12. The method of claim 11 further comprising:
communicating from the client information handling system a transition by the client information handling system from external power to internal power; and
in response to the transition, re-establishing the virtual desktop presentation with a graphics processing unit virtual desktop display protocol instead of a central processing unit virtual desktop display protocol.

13. The method of claim 9 further comprising:
including with the request an indication that the client information handling system comprises a non-mobile system; and
prioritizing central processing unit virtual desktop display protocols over graphics processing unit virtual desktop display protocols to respond to the request.

14. The method of claim 9 wherein selecting a virtual desktop display protocol based on the prioritized list further comprises:
determining a server information handling system interfaced with the network having support for the virtual desktop display protocol on the prioritized list; and
forwarding the client information handling system request to the determined server information handling system.

15. The method of claim 14 further comprising supporting the virtual desktop request at the determined server information handling system with a virtual machine executing at the determined server information handling system.

16. A non-transitory machine readable medium storing instructions executable on a processor to:
analyze a request from a client information handling system for a virtual desktop presentation;
apply the analyzed request to prioritize a list of available virtual desktop display protocols for responding to the request based upon conditions at the client information handling system as determined from the request at the time of receipt of the request and before initiating the virtual desktop in response to the request; and
automatically respond to the request by communicating a virtual desktop to the client information handling system with the available virtual desktop display protocol having the greatest priority;
wherein:
the request indicates the client information handling system has external power; and
the prioritized list increases priority for central processing unit virtual desktop display protocols over graphics processing unit virtual desktop display protocols.

17. The non-transitory machine readable medium of claim 16 wherein:
the request indicates that the client information handling system is a mobile information handling system; and
the prioritized list increases priority for graphics processing unit virtual desktop display protocols over central processing unit virtual desktop display protocols.

* * * * *